United States Patent
Tanaka

(10) Patent No.: US 7,187,097 B2
(45) Date of Patent: Mar. 6, 2007

(54) PUMP ACTUATION MOTOR

(75) Inventor: Tomohide Tanaka, Nagano-ken (JP)

(73) Assignee: Nissin Kogyo Co., Ltd., Nagano-ken (JP)

( * ) Notice: Subject to any disclaimer, the term of this patent is extended or adjusted under 35 U.S.C. 154(b) by 0 days.

(21) Appl. No.: 10/222,908

(22) Filed: Aug. 19, 2002

(65) Prior Publication Data
US 2003/0035716 A1 Feb. 20, 2003

(30) Foreign Application Priority Data
Aug. 20, 2001 (JP) ............... P.2001-249465

(51) Int. Cl.
H02K 5/04 (2006.01)
H02K 7/08 (2006.01)
F04B 53/00 (2006.01)
B60T 17/02 (2006.01)

(52) U.S. Cl. ............... 310/90; 310/89; 310/154.14; 417/423.12

(58) Field of Classification Search ............... 310/42, 310/89, 91, 90, 154.08, 154.14; 417/423.12
See application file for complete search history.

(56) References Cited

U.S. PATENT DOCUMENTS 4,134,712 A * 1/1979 Kemmner et al. ..... 417/423.12
4,636,107 A * 1/1987 Casler et al. ............... 411/477
5,610,456 A * 3/1997 Wille et al. ................. 310/58
5,977,672 A * 11/1999 Vacca ........................ 310/90
5,977,673 A * 11/1999 Iwata ......................... 310/90
6,163,093 A * 12/2000 Shimizu et al. .............. 310/42
6,196,812 B1 3/2001 Siegel
6,198,189 B1 * 3/2001 Takahashi et al. ........... 310/89
6,215,215 B1 4/2001 Huber et al.

FOREIGN PATENT DOCUMENTS

| EP | 44 19 758 A1 | 12/1995 |
| JP | 7-194069 | 7/1995 |
| JP | 10-089238 | 4/1998 |
| JP | 10-89238 | 4/1998 |
| JP | 10-322963 | 12/1998 |
| JP | 2001-211599 | * 8/2001 |
| JP | 2000-278908 | 10/2002 |

OTHER PUBLICATIONS

English Language Abstract of JP 7-194069.
English Language Abstract of JP 10-322963.
English Language Abstract of JP 10-89238.

* cited by examiner

Primary Examiner—Burton Mullins
(74) Attorney, Agent, or Firm—Greenblum & Bernstein, P.L.C.

(57) ABSTRACT

A rotor is provided so that a rotor-side end part of a rotation shaft is rotatably supported by a bearing accommodated in a bearing accommodating part provided in a bottom part of a yoke in such a way as to project to a rotor side, and a part of an armature winding wound around a core surrounds the bearing accommodating part through an insulator.

19 Claims, 2 Drawing Sheets

PUMP ACTUATION MOTOR

BACKGROUND OF THE INVENTION

1. Field of the Invention

The present invention relates to a pump actuation motor for use in a vehicle brake hydraulic control apparatus.

2. Description of the Related Art

In a brake hydraulic control apparatus for use in a vehicle, for example, an antilock braking system, a pump is provided in a hydraulic pressure circuit, which is connected to reservoirs, so as to return brake fluid, which is reserved in the reservoirs, to a brake master cylinder. This pump is actuated by a motor to thereby return brake fluid to the master cylinder.

The configuration of this pump actuation motor is such that a drive motor is configured so that an eccentric shaft side part of a drive shaft is rotatably supported at a side of a pump unit in a cantilever-like manner, as described in JP-A-10-892238, and so that the other end side part of the drive shaft is inserted into a cup-like motor casing and provided with a rotor, a collector (that is, a commutator), and a brush. The other end side part of the drive shaft is rotatably supported by fitting a ball bearing into a concave part that is formed by causing the bottom part of the motor casing to outwardly expand. Further, the rotor is provided by winding an armature winding around a core, which is fitted into the drive shaft, through an insulator. The insulator is placed nearly in series with the ball bearing into which the other end side part of the drive shaft is fitted.

The pump actuation motor disclosed in JP-A-10-89238 is configured so that the other end side part of the drive shaft of the motor is rotatably supported by the ball bearing fitted into the concave part, which is formed by outwardly expanding the bottom part of the motor casing, and that the insulator is placed nearly in series with the ball bearing because the clearance between the rotor and the ball bearing should be maintained. Thus, the drive shaft is lengthened. Consequently, there has been a fear that vibrations of the rotor may occur at actuation of the motor, or during an operation of the motor.

Further, the drive shaft is rotatably supported on the pump unit side in a cantilever-like manner. Thus, the length of the rotor side of the drive shaft should be shorten as much as possible. Consequently, an occurrence of a vibration of the rotor can be restrained by rotatably supporting the bearing part at a place that is close to the center of gravity of the rotor. Moreover, the miniaturization of ball bearing is enabled.

SUMMARY OF THE INVENTION

Accordingly, an object of the invention is to solve the problems of the aforementioned conventional motor, and to provide a pump actuation motor formed by decreasing the size in the axial direction of the outer shape thereof and by reducing the influence of the vibration of the rotor.

To solve the problems, according to the invention, there is provided a pump actuation motor (hereunder referred to as a first pump actuation motor of the invention), which has the following configuration.

That is, the pump actuation motor of the invention comprises a yoke, a rotation shaft having a support shaft part, which is inserted into and supported by a system main body, and an eccentric shaft part, which actuates the pump, at an end side thereof and also having a rotor, which is formed by winding an armature winding around a core through an insulating insulator, and a commutator attached to the other end side thereof, a brush holder for holding a brush enabled to feed electric power, which is supplied from said system main body, to said commutator, and a housing interposed between the yoke and the system main body in such a way as to cover an opening part of the yoke. In this motor, the rotor is provided so that the other end side of the rotation shaft is rotatably supported by a bearing accommodated in a bearing accommodating part, which is provided in a bottom part of the yoke in such a manner as to project toward the rotor, and that a part of the armature winding wound around the core, surrounds the bearing accommodating part through the insulator.

Further, according to an embodiment (hereunder referred to as a second pump actuation motor of the invention) of the first pump actuation motor of the invention, the bearing accommodating part is formed by performing bending processing on the yoke.

DETAILED DESCRIPTION OF THE PREFERRED EMBODIMENT

Hereinafter, a preferred embodiment of the invention is described in detail with reference to the accompanying drawings.

The following description of this embodiment describes a pump actuation motor for use in a vehicle brake hydraulic control apparatus.

First, the configuration of the pump actuation motor is described hereinbelow with reference to FIGS. 1 to 3.

Figure 1:
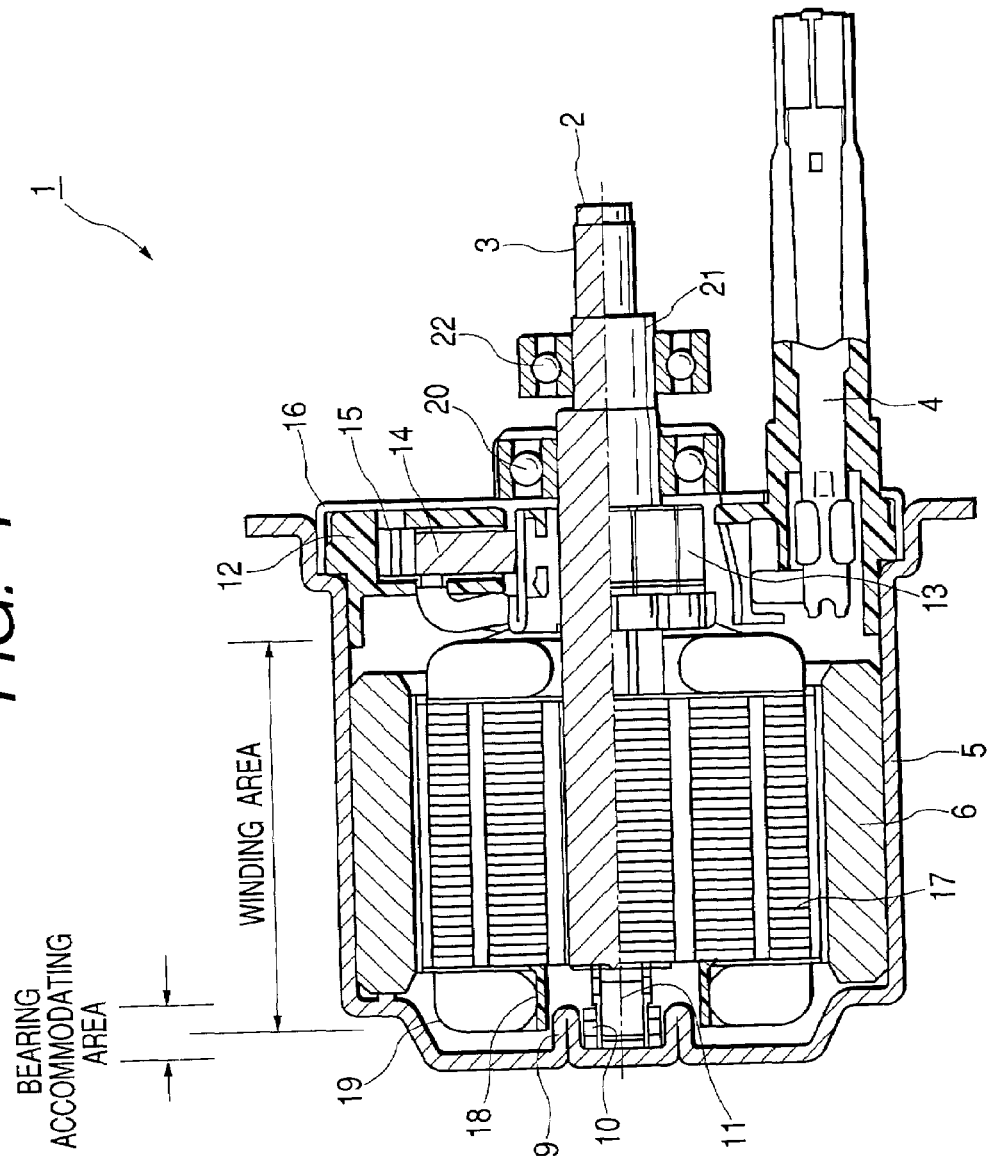
FIG. 1 is a sectional explanatory view illustrating a pump actuation motor.

As shown in FIG. 1, the pump actuation motor 1 is attached to a block body (not shown) in which a plunger pump and an electronic control unit (ECU) are provided. The pump actuation motor 1 is attached and fixed thereto by inserting a main-body-side end part 3 serving as one end side part of a rotation shaft 2 into the block body (not shown) and inserting a terminal 4, which feeds electric power to the motor, into a connection terminal (ECU (not shown)).

A DC motor of the inner-rotor-type is used as the pump actuation motor 1. First, the structure at a stator side is described hereinbelow. Reference numeral 5 designates a yoke formed like a cup, and constitutes a sheath of the motor. Preferably, metallic materials, for example, deep drawing steel (SPCE), are used as the material of this yoke 5. A plurality of (in this embodiment, two) circular-arc magnets 6 each constituted by a magnetic material, such as a ferrite, are attached to the inner wall surface of the yoke 5, and magnetized in a necessary number of magnetic poles (in the case of this embodiment, quadrupoles).

Figure 2:
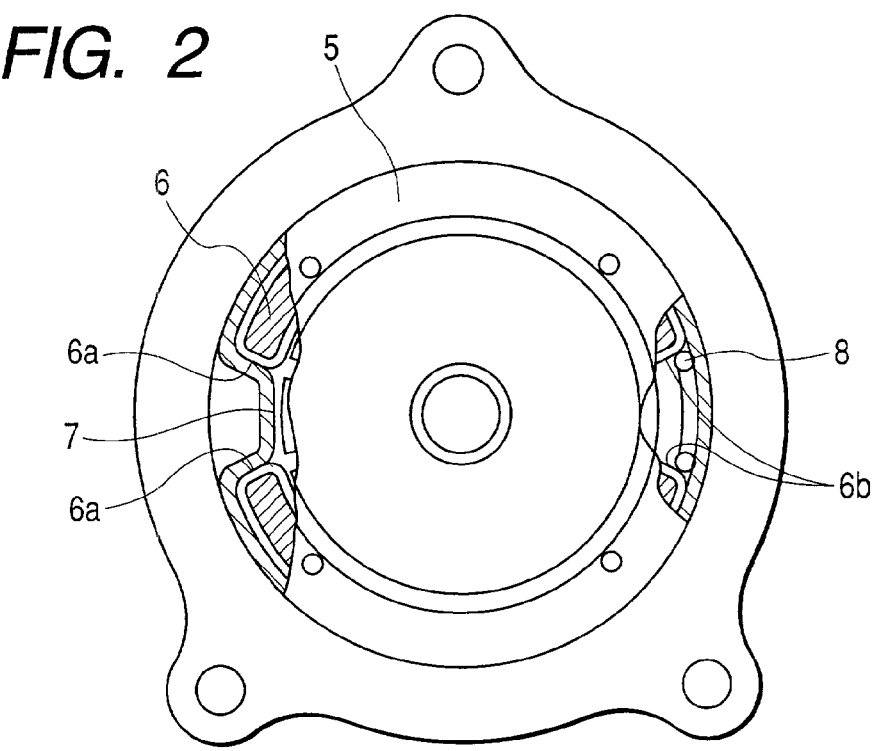
FIG. 2 is a left-hand side view illustrating the pump actuation motor of FIG. 1.
Figure 3:
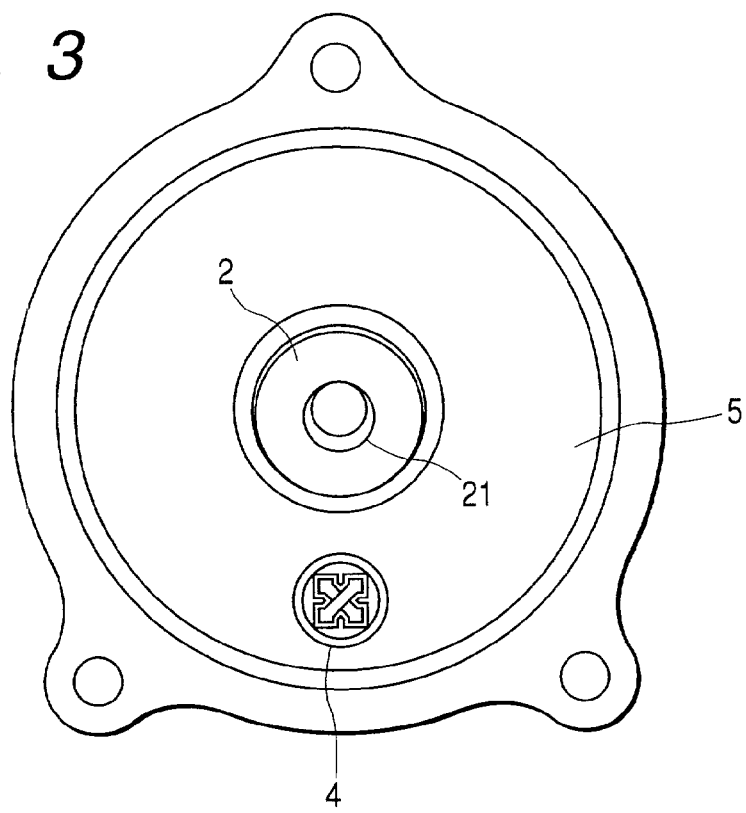
FIG. 3 is a right-hand side view illustrating the pump actuation motor of FIG. 1.

As illustrated in FIG. 2, a projecting ridge 7 is axially formed on the inner wall of the yoke 5 in such a manner as to inwardly expand. Each of the magnets 6 has one end part 6a abutted against a corresponding one of both sides of the projecting ridge 7. Further, a clip 8 as an elastic member is attached resiliently to between the other end parts 6b of the magnets 6. Thus, a pushing force in the circumferential direction of each of the magnets 6 is enhanced, so that each of the magnets is mechanically securely attached thereonto. The magnets 6 can be detached by removing the clip 8, and thus is recyclable.

Further, the bottom part of the yoke 5 is formed without outwardly expanding, and a bearing accommodating part 9 protruding toward the rotor is formed therein. This bearing accommodating part 9 is formed by inwardly bending the bottom part of the yoke 5 in the axial direction by press-forming. A projecting wall protruding to the rotor side may be formed in the bottom part of the yoke 5 by a method that is not limited to the bending processing. A rolling bearing 10 is fitted in the bearing accommodating part 9. A rotor-side end part 11, which is the other side of the rotation shaft 2, is rotatably supported by this rolling bearing 10. The rolling bearing 10 is firmly held by performing fitting thereof into the bearing accommodating part 9 due to the bending processing and by the elasticity of a bending part. Incidentally, a part to be fitted into the bearing accommodating part 9 is not limited to the rolling bearing 10, but may be a sliding bearing. Thus, reduction in the shaft length of the rotation shaft 2 and in the size of the bearing part to be accommodated can be promoted by the bearing accommodating part 9 by forming the bearing accommodating part 9 in such a way as to project toward the rotor side from the bottom part of the yoke 5. Furthermore, since the bearing accommodating part 9 can be formed when the press-forming of the yoke 5 is performed, working efficiency is high.

A brush holder 12 is provided at an opened-side part (that is, a block-body-side part) of the yoke 5. The brush holder 12 holds a brush 14 enabled to feed electric power from the block-body side to a commutator 13 through the terminal 4. The brush holder 12 is fitted into a step part formed in an opening side of the yoke 5 by being abutted thereagainst. The brush 14 is pushed by a spring 15 provided resiliently between the brush 14 and the inner wall of the brush holder 12 in such a way as to be always in slide-contact with the commutator (or collector) 13. Reference numeral 16 denotes a housing that is fitted into the yoke 5 from the outside of the brush holder 12 in such a way as to cover the opening of the yoke 5, and that is interposed between the yoke 5 and the block body serving as the system main body. As illustrated in FIG. 3, the terminal 4 is provided in such a manner as to project toward the block body through a through hole formed in the housing 16.

Next, the constitution of the rotor of the motor is described hereinbelow. In FIG. 1, reference numeral 17 designates a core that is fitted into the rotation shaft 2 in such a way as to be integral therewith. An insulator 18, which is made of an insulating material, covers around this core 17. An armature winding 19 (that is, a magnet wire) is wound around a slot formed in the core 17. The other end side part (that is, the rotor-side end part 11) of the insulator 18 is formed so that a certain radial clearance between the other end side part and the bearing accommodating part 9 is maintained, and that the armature winding at the other end side part surrounds the bearing accommodating part 9 in a non-contact manner. That is, the rotor is fitted into the rotation shaft 2 in an overlapped position in which a part of the armature winding 19 wound around the core 17 overlaps with the bearing accommodating part 9 in an axial direction.

Thus, the motor is assembled so that a part of the winding area of the core 17 constituting the rotor overlaps with a bearing accommodating area, which supports the other end side of the rotation shaft 2, in an axial direction. Consequently, the axial length of the motor is reduced, so that the miniaturization of the motor is achieved. Further, since the rotor can be rotatably supported at a place that is close to the center of gravity thereof, the vibrations of the rotor can be reduced.

The commutator 13 is fitted into the rotor-side end part 10 that is the other end part of the rotation shaft 2. The armature winding 19 is energized in such a way as to push the rotor in the direction of rotation thereof. The brush 14 is in push-contact with the commutator 13, so that electric power is supplied from the block body side (not shown) through the terminal 4.

A supporting ball bearing 20 is pressure-fitted into the rotation shaft 2. This supporting ball bearing 20 is fitted thereinto in such a manner as to be accommodated between the brush holder 12 and the housing 16. The housing 16 covering the outer periphery of the supporting ball bearing 20 is pressure-fitted into the block body side (not shown), so that the supporting ball bearing 20 undergoes a radial load imposed on the rotation shaft 2. Further, an eccentric shaft part 21 is formed in the vicinity of the main-body-side end part 3 of the rotation shaft 2. An actuation ball bearing 22 is pressure-fitted into this eccentric shaft part 21. This actuation ball bearing 22 is adapted to cause a piston of a plunger pump (not shown) to link with a spring and to perform reciprocating motion.

To attach the aforementioned pump actuation motor 1 to the block body (not shown), the main-body-side end part 3 of the rotation shaft 2 is pressure-fitted into the block body side so that the actuation ball bearing 22 and the supporting ball bearing 20 are supported thereon. Further, the outer periphery of the housing 16 is sealed. Thus, the pump actuation motor 1 is attached to the block body (not shown).

Although the pump actuation motor 1 of the inner-rotor-type has been described in the description of the aforementioned embodiment of the invention, needless to say, the invention can be applied to an outer-rotor-type motor. It will apparent that numerous modifications thereof may be made without departing from the sprit and scope of the invention.

According to the first pump actuation motor of the invention, a part of the winding area of the core of the rotor is attached in such a way as to axially overlap with the bearing accommodating area that supports the other end side part of the rotation shaft. Thus, the miniaturization of the motor is achieved by reducing the axial length of the motor. Further, the rotor can be rotatably supported at a position that is close to the center of gravity thereof. Consequently, the vibrations of the rotor can be reduced.

According to the second pump actuation motor of the invention, the bearing accommodating part is formed when press-molding is performed. Thus, working efficiency can be enhanced.

What is claimed is:

1. A pump actuation motor for actuating a pump, comprising:
   a yoke;
   a rotation shaft including one end having a support shaft part inserted into and which is supported to a system main body and an eccentric shaft part for actuating said pump, and the other end includes a rotor formed by winding an armature winding around a core through an insulator, and a commutator are attached;
   a brush holder for holding a brush feeding electric power supplied from said system main body, to said commutator;
   a housing interposed between said yoke and said system main body in such a way as to cover an opening part of said yoke; and a bearing accommodated in a bearing accommodating part formed in a bottom part of said yoke, which has a closed end, to project toward said rotor, so that the other end of said rotation shaft is rotatably supported, wherein said armature winding wound around said core at least partially surrounds said bearing accommodating part through said insulator.

2. The pump actuation motor according to claim 1, wherein said bearing accommodating part is formed by bending said yoke.

3. The pump actuation motor according to claim 1, further comprising:

a plurality of arc-shaped magnets disposed opposite to said core;

a projecting ridge axially formed on an inner wall of said yoke in such a manner as to be inwardly projected; and an elastic member for holding said magnets along said inner wall of said yoke in cooperation with said projecting ridge.

4. The pump actuation motor according to claim 3, wherein the elastic member is a clip attached resiliently between end parts of the plurality of arc-shaped magnets.

5. The pump actuation motor according to claim 1, wherein the bearing accommodating part is a projecting wall formed inwardly at a bottom part of the yoke in an axial direction.

6. The pump actuation motor according to claim 1, wherein the bearing is one of a rolling bearing and a sliding bearing fitted into the bearing accommodating part.

7. The pump actuation motor according to claim 1, wherein the bearing is held in the bearing accommodating part by press-fit and an elasticity of the bearing accommodating part.

8. The pump actuation motor according to claim 1, wherein the other end of the rotation shaft is rotatably supported by the bearing placed about an outer portion thereof.

9. The pump actuation motor according to claim 1, wherein the bearing accommodating part is an inwardly projecting wall forming a seat surrounded by the inwardly projecting wall, and the bearing fits within the seat formed by the inwardly projecting wall.

10. The pump actuation motor according to claim 1, wherein a part of the winding of the core axially overlaps with the bearing accommodating area that supports the other end of the rotation shaft.

11. The pump actuation motor according to claim 10, wherein the rotor is rotatably supported at a position close to a center of gravity thereof.

12. The pump actuation motor according to claim 10, wherein the other end of the rotation shaft is inserted within a space formed by the bearing accommodating part.

13. The pump actuation motor according to claim 10, wherein the insulator is formed so that a radial clearance between the other end and the bearing accommodating part is maintained, and the armature winding at the other end surrounds the bearing accommodating part in a non-contact manner.

14. The pump actuation motor according to claim 13, wherein the rotor is fitted into the rotation shaft in an overlapped position in which a part of the armature winding wound around the core overlaps with the bearing accommodating part in an axial direction.

15. A pump actuation motor for actuating a pump, comprising:

a yoke;

a rotation shaft including a first end and a second end, the first end comprising an eccentric shaft part, and the second end forming a rotor by winding an armature winding around a core through an insulator;

a brush holder positioned within a part of the yoke, the brush holder holding a brush which feeds electric power to a commutator;

a housing covering an opening part of the yoke;

a bearing accommodating part having a closed end projecting inwardly from a bottom part of the yoke towards the rotor; and a bearing accommodated within the bearing accommodating part such that the bearing surrounds and rotatably supports an outer part of the rotation shaft, wherein the insulator is positioned at least partially between the bearing accommodating part and the armature winding.

16. The pump actuation motor according to claim 15, wherein:

the bearing accommodating part is a projecting wall formed inwardly at a bottom part of the yoke in an axial direction;

the bearing is one of a rolling bearing and a sliding bearing fitted into the bearing accommodating part; and the bearing is held in the bearing accommodating part by press-fit and an elasticity of the bearing accommodating part.

17. The pump actuation motor according to claim 15, wherein the bearing accommodating part is an inwardly projecting wall forming a seat surrounded by the inwardly projecting wall, the bearing sits within the seat formed by the inwardly projecting wall.

18. The pump actuation motor according to claim 15, wherein a part of the winding of the core axially overlaps with the bearing accommodating area that supports the second end of the rotation shaft.

19. The pump actuation motor according to claim 15, wherein the second end of the rotation shaft is inserted within a space formed by the bearing accommodating part.

* * * * *